(12) United States Patent
Israel et al.

(10) Patent No.: US 10,623,374 B2
(45) Date of Patent: Apr. 14, 2020

(54) AUTOMATIC NETWORK IDENTIFICATION FOR ENHANCED COMMUNICATIONS ADMINISTRATION

(71) Applicant: Microsoft Technology Licensing, LLC, Redmond, WA (US)

(72) Inventors: Moshe Israel, Ramat-Gan (IL); Ben Kliger, Ramat-Gan (IL); Michael Zeev Bargury, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 327 days.

(21) Appl. No.: 15/618,324

(22) Filed: Jun. 9, 2017

(65) Prior Publication Data

US 2018/0359219 A1 Dec. 13, 2018

(51) Int. Cl.
*G06F 9/00* (2006.01)
*G06F 15/16* (2006.01)
(Continued)

(52) U.S. Cl.
CPC ......... *H04L 63/0272* (2013.01); *G06N 20/00* (2019.01); *H04L 41/16* (2013.01);
(Continued)

(58) Field of Classification Search
CPC .. H04L 63/0272; H04L 43/045; H04L 43/028
(Continued)

(56) References Cited

U.S. PATENT DOCUMENTS

| 8,424,074 B2 | 4/2013 | Cyprus et al. |
| 9,571,457 B1 | 2/2017 | Hoy et al. |
| (Continued) | | |

FOREIGN PATENT DOCUMENTS

| EP | 2439637 A1 | 4/2012 |
| WO | 2005125103 A1 | 12/2005 |
| WO | 2016154419 A1 | 9/2016 |

OTHER PUBLICATIONS

Destino, et al., "Network boundary recognition via graph-theory", In Proceedings of 2008 5th Workshop on Positioning, Navigation and Communication, Mar. 27, 2008, pp. 271-275.
(Continued)

*Primary Examiner* — Wasika Nipa
*Assistant Examiner* — Samuel Ambaye
(74) *Attorney, Agent, or Firm* — Ogilvie Law Firm

(57) ABSTRACT

Described technologies automatically detect candidate networks having external nodes which communicate with nodes of a local network; a candidate external network can be identified even when the external nodes are owned by a different entity than the local network's owner. A list of network addresses which communicated with local network nodes is culled to obtain addresses likely to communicate in the future. A graph of local and external nodes is built, and connection strengths are assessed. A candidate network is identified, based on criteria such as connection frequency and duration, domain membership, address stability, address proximity, and others, using cutoff values that are set by default or by user action. The candidate network identification is then utilized as a basis for improved security though virtual private network establishment, improved bandwidth allocation, improved traffic anomaly detection, or network consolidation, for example.

20 Claims, 7 Drawing Sheets

(51) Int. Cl.
| G06F 17/00 | (2019.01) |
| H04L 29/06 | (2006.01) |
| H04L 12/24 | (2006.01) |
| H04L 29/08 | (2006.01) |
| H04L 12/26 | (2006.01) |
| G06N 20/00 | (2019.01) |
| H04W 40/32 | (2009.01) |
| H04L 12/715 | (2013.01) |

(52) U.S. Cl.
CPC .......... *H04L 43/028* (2013.01); *H04L 43/045* (2013.01); *H04L 45/46* (2013.01); *H04L 63/065* (2013.01); *H04L 63/1425* (2013.01); *H04L 67/10* (2013.01); *H04W 40/32* (2013.01)

(58) Field of Classification Search
USPC .......................................................... 726/15
See application file for complete search history.

(56) References Cited

U.S. PATENT DOCUMENTS

| 2003/0088697 | A1 | 5/2003 | Matsuhira | |
| 2005/0135269 | A1 | 6/2005 | Saint-Hilaire et al. | |
| 2009/0003356 | A1* | 1/2009 | Vaswani | H04L 45/00 370/400 |
| 2013/0254847 | A1* | 9/2013 | Adams | G06F 21/6218 726/4 |
| 2014/0245443 | A1 | 8/2014 | Chakraborty | |
| 2016/0087940 | A1 | 3/2016 | Miller et al. | |
| 2018/0114017 | A1* | 4/2018 | Leitner | G06F 21/554 |

OTHER PUBLICATIONS

"International Search Report and Written Opinion Issued in PCT Application No. PCT/US2018/035229", dated Aug. 2, 2018, 12 Pages.
McGuire, et al., "About VPN Gateway", https://docs.microsoft.com/en-us/azure/vpn-gateway/vpn-gateway-about-vpngateways, Published on: Apr. 4, 2017, 10 pages.
Rossberg, et al., "A survey on automatic configuration of virtual private networks", In International Journal of Computer and Telecommunications Networking, vol. 55, Issue 8, Jun. 2011, 1 page.
"Virtual private network for secure private communications", https://www.ibm.com/support/knowledgecenter/ssw_ibm_i_71/rzaj4/rzaj45zxaddingvpn.htm, Retrieved on: May 9, 2017, 3 pages.
Aaron Beach, et al., "Network Traffic Anomaly Detection and Characterization", http://cs.northwestern.edu/~ajb200/anomaly%20detection%20paper%201.0.pdf, 2004, 7 pages.
"Address Resolution Protocol", https://en.wikipedia.org/wiki/Address_Resolution_Protocol, May 15, 2017, 7 pages.
James Le, et al., "The 10 Algorithms Machine Learning Engineers Need to Know", http://www.kdnuggets.com/2016/08/10-algorithms-machine-learning-engineers.html, Aug. 2016, 15 pages.
"Bandwidth Manager Software", http://www.antamedia.com/bandwidth-manager/, Retrieved May 20, 2017, 10 pages.
"5 Best VPN Software & Applications of 2017", https://www.bestvpn.com/best-vpn-software/, Retrieved May 20, 2017, 12 pages.
Robert Beverly, et al., "An Internet Protocol Address Clustering Algorithm", https://www.usenix.org/legacy/event/sysml/tech/full_papers/beverly/beverly_html/paper.html, Nov. 21, 2008, 12 pages.
Silver Moon, "10 examples of Linux ss command to monitor network connections", http://www.binarytides.com/linux-ss-command/, Apr. 1, 2014, 8 pages.
"Top Cloud Management Software Products", http://www.capterra.com/cloud-management-software/, Retrieved May 20, 2017, 31 pages.
Kuong-ho Chen, et al., "ZERO-Conflict: A Grouping Based Approach tor Automatic Generation of IPSec/VPN Security Policies", http://download.springer.com/static/pdf/180/chp%253A10.1007%252F11907466_17.pdf?originUrl=http%3A %2F%2Flink.springer.com%2Fchapter%2F10.1007%2F11907466_17&token2=exp=1493657667~acl=%2Fstatic% 2Fpdf%2F180%2Fchp%25253A10.1007%25252F11907466_17.pdf%3ForiginUrl%3Dhttp%253A%252F%252Flink.springer.com%252Fchapter%252F10.1007%.
"Classless Inter-Domain Routing", https://en.wikipedia.org/wiki/Classless_Inter-Domain_Routing, Mar. 27, 2017, 8 pages.
Jeff Tyson, "How Firewalls Work", http://computerhowstuffworks.com/firewall2.htm, Retrieved May 20, 2017, 3 pages.
"How to get a list of all valid IP addresses in a local network?", http://stackoverflow.com/questions/13669585/how-to-get-a-list-of-all-valid-ip-addresses-in-a-local-network, Apr. 16, 2013, 2 pages.
Asim Karim, et al., "Clustering IP Addresses Using Longest Prefix Matching and Nearest Neighbor Algorithms", https://www.researchgate.net/publication/221419921_Clustering_IP_Addresses_Using_Longest_Prefix_Matching_and_Nearest_Neighbor_Algorithms, Aug. 2004, 3 pages.
"k means clustering of ip address data in matlab", http://stackoverflow.com/questions/40826155/k-means-clustering-of-ip-address-data-in-matlab, Nov. 27, 2016, 2 pages.
"Host Discovery", https://nmap.org/book/man-host-discovery.html, Retrieved May 20, 2017, 5 pages.
"Nessus (software)", https://en.wikipedia.org/wiki/Nessus_(software), Apr. 13, 2017, 4 pages.
"NetFlow Traffic Analyzer", http://www.solarwinds.com/netflow-traffic-analyzer, Retrieved May 20, 2017, 4 pages.
"netstat", https://en.wikipedia.org/wiki/Netstat, Sep. 28, 2016, 6 pages.
"Nmap", https://en.wikipedia.org/wiki/Nmap, May 9, 2017, 8 pages.
"Tool to group a list of IP addresses into IP ranges", https://superuser.com/questions/885351/tool-to-group-a-list-of-ip-adresses-into-ip-ranges, Mar. 14, 2015, 2 pages.
Stefano Gridelli, "Top 5 Linux utilities for network engineers", https://netbeez.net/2016/02/18/top-5-linux-utilities-for-network-engineers/, Feb. 18, 2016, 13 pages.
"How to Find the Senders Original IP Address Using Email Message Headers", http://www.johnru.com/active-whois/trace-email.html, Retrieved May 17, 2017, 5 pages.
Zhi (Judy) Fu, et al., "Automatic Generation of IPSec/VPN Security Policies in an Intra-Domain Environment", http://proceedings.utwente.nl/24/1/S8-3.pdf, Oct. 2001, 12 pages.

\* cited by examiner

FIGURE 6 REPRESENTATION MODIFIED TO REFLECT CULLING BASED ON COMMUNICATION LIKELIHOOD THRESHOLD

A VISUAL REPRESENTATION OF A GRAPH CONNECTING NODES OF A LOCAL (A.K.A. FIRST) NETWORK TO EXTERNAL NODES

FIGURE 8 VISUAL REPRESENTATION MODIFED TO SHOW
WHICH EXTERNAL NODES HAVE A STRONG CONNECTION
TO THE LOCAL NETWORK

FIGURE 9 VISUAL REPRESENTATION WITH IDENTIFIED EXTERNAL NODES GROUPED INTO A CANDIDATE EXTERNAL NETWORK

AUTOMATIC NETWORK IDENTIFICATION FOR ENHANCED COMMUNICATIONS ADMINISTRATION

BACKGROUND

A computer network includes nodes which communicate data with one another. The nodes may be servers, computers, smartphones, smart appliances, networked vehicles, or other devices which have at least a processor and a network interface. The data may be sent over wired, optical, wireless, or other communication channels, using any of a wide variety of network protocols. The data at a given point in its travel may be plaintext, encrypted, encoded, compressed, divided, or otherwise characterized.

The defined extent of a network may vary according to the definition used. For instance, one may take the view that every node capable of communicating, either directly or indirectly, with a given node X belongs to the same network as node X. In that view, every one of the several billion devices presently connected to the internet belongs to the same network. Alternately, one may use a network definition based on one or more practical realities of network administration. One may decide, for example, that cloud data center servers which are owned by entity A but used by entity B under a service agreement are in a different network than computers which are solely owned and operated by B and in which A has no legal rights. As another example, one could define a first set of nodes as belonging to a different network than a second set of nodes when authentication tokens or certificates that are recognized in the first set of nodes are routinely rejected in the second set, and vice versa. Similarly, networks may be defined in terms of physical connections between nodes, or the relation of nodes to firewalls or to network address translation devices, or nodes' relation to a gateway, or the use or non-use of particular kinds of addresses (e.g., internet protocol addresses versus media access control addresses), or address prefixes, or the use or non-use of bridges or routers, or other technical criteria, or some combination of the foregoing.

SUMMARY

Some technologies described herein are directed to the technical activity of automatically identifying members of a second network based on data about communications with one or more nodes of a first network. Some teachings are directed to automatic formulation of recommendations for changes in networked communication configuration or administration, and in particular, to the challenge of automatically identifying circumstances in which communications data indicate that adding a virtual private network is a suitable recommendation. Technical mechanisms are described for grouping nodes into a candidate network based on criteria such as the relative amount of communications, the stability of node addresses, the strength of connections between nodes, and other criteria. Other technical activities pertinent to teachings herein will also become apparent to those of skill in the art.

Some examples provided herein are directed to tools or techniques for analyzing or improving network-to-network communications. Some examples obtain a list of IP addresses which have communicated with nodes in a first network, cull from that list a set of external nodes which have at least a specified likelihood of future communications with the first network, generate a graph which connects one or more nodes of the first network with one or more of the external nodes, use the graph to identify external nodes which have at least a specified strength of connection with the first network, and group at least a portion of the external nodes into a candidate external network. The identification of the candidate external network may be displayed, and it may be utilized for improvements in network administration, which is an example of communications administration. For instance, one may establish a virtual private network to carry traffic between the first network and the candidate external network. One may also or alternately use the candidate external network identification to better allocate bandwidth, to help detect anomalous traffic, to alter network membership, or for other network administration tasks.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
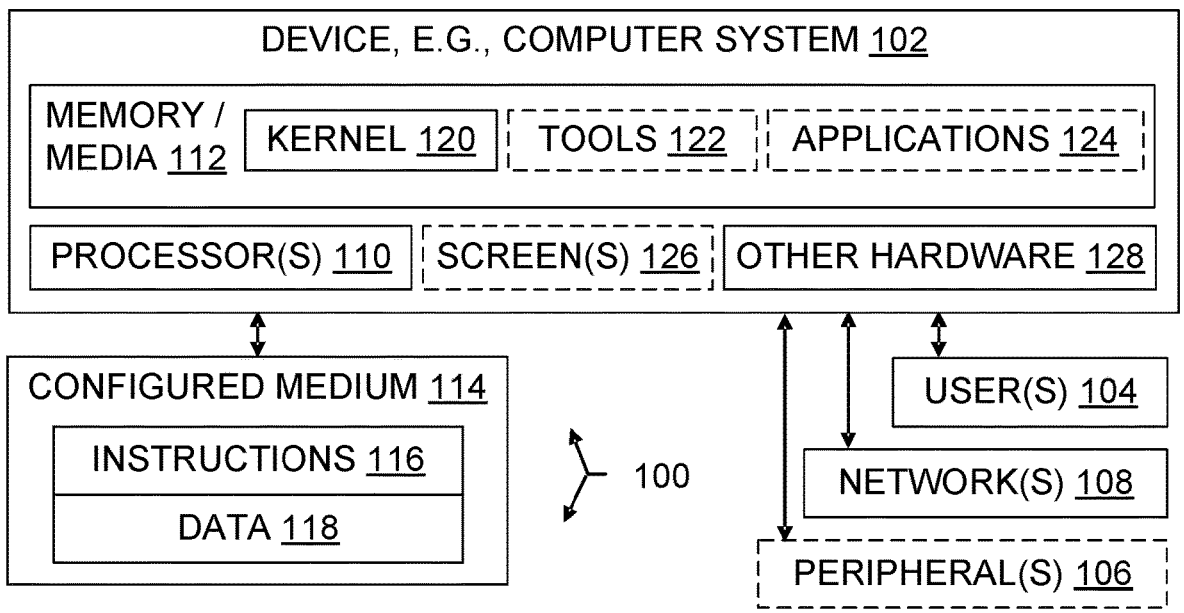
FIG. 1 is a block diagram illustrating a computer system having at least one processor, at least one kernel such as an operating system, and at least one memory, which interact with one another, and also illustrating a configured storage medium.

Many organizations operate today in a hybrid environment, with some resources running in an on-premises environment and others located in one or more cloud environments. Some organizations operate in a private and public cross-cloud environment, or in another mixture of public, third-party, and proprietary computing environments. Large organizations may have dozens or hundreds of isolated networks, due to management decisions. For example, different software development teams might have their own respective private subscriptions to services such as those provided by Microsoft Azure®, Amazon AWS®, Google®, Rackspace®, or another provider (Azure is a mark of Microsoft Corporation, AWS is a mark of Amazon Technologies, Inc., Google is a mark of Google, Inc., and Rackspace is a mark of Rackspace US, Inc.). In such a situation, if one team is consuming a networked service provided by another team in the organization, then communications implementing that service consumption may be sent over the internet, and thus be exposed to security risks that are present in internet communication.

A challenge for an organization is how best to identify which networks should be connected, and how best to connect them. A related challenge is how an entity can identify the extent of a remote network that is owned by a different entity. Teachings disclosed herein inform solutions to address those challenges and other problems discussed herein. Some of the examples taught herein automatically generate a communications-history-based recommendation to create a virtual private network (VPN) between isolated networks. Such a VPN can lower the attack surface on these networks by reducing or eliminating traffic between the formerly isolated networks which travels over the internet in an unprotected manner even though the traffic begins and ends at locations within the organization.

Some embodiments described herein may be viewed in a broader context. For instance, concepts such as connections, graph usage, identification, probability, stability, and strength may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving graph usage, identification, probability, stability, or strength are outside the present scope. Accordingly, vagueness, mere abstractness, lack of technical character, and accompanying proof problems are also avoided under a proper understanding of the present disclosure.

Technical Character

The technical character of embodiments described herein will be apparent to one of ordinary skill in the art, and will also be apparent in several ways to a wide range of attentive readers. Some embodiments address technical activities that are rooted in computing technology, such as analyzing networked communications, identifying network nodes and network extent, and inferring groups of network nodes based on communications and other data, each of which activities facilitates effective administration of networked communications. Some activities of embodiments support the detection of anomalous traffic that may be a symptom of unauthorized or abnormal use of processing hardware. Some support the identification of particular virtual private network candidates whose creation will substantially improve network security, e.g., by protecting traffic which satisfies technical criteria such as address stability and at least a minimum probability of future communications between a given pair of nodes or node sets.

Some embodiments include technical components such as computing hardware which interacts with software in a manner beyond the typical interactions within a general purpose computer. For example, in addition to normal interaction such as memory allocation in general, memory reads and writes in general, instruction execution in general, and some sort of I/O, some embodiments described herein implement network-to-network communications analysis steps disclosed herein.

Technical effects provided by some embodiments include more efficient detection of security attacks by removing non-anomalous traffic from the data set considered, more cost-effective security for frequent communication paths, or a better basis for allocating bandwidth based on the likelihood of use of endpoints for future traffic.

Some embodiments include technical adaptations such as a graph of nodes whose connections surpass a communications likelihood threshold, or a VPN candidate network that does not necessarily coincide with any pre-existing network definition but reflects substantial unsecured traffic.

Other advantages based on the technical characteristics of the teachings will also be apparent to one of skill from the description provided.

ACRONYMS AND ABBREVIATIONS

Some acronyms and abbreviations are defined below. Others may be defined elsewhere herein or require no definition to be understood by one of skill.

ALU: arithmetic and logic unit
API: application program interface
APP: application
BIOS: basic input/output system
CD: compact disc
CPU: central processing unit
DNS: domain name system
DVD: digital versatile disk or digital video disc
FPGA: field-programmable gate array
FPU: floating point processing unit
GPU: graphical processing unit
GUI: graphical user interface
IDE: integrated development environment, sometimes also called "interactive development environment"
IP: internet protocol
ISP: internet service provider
LAN: local area network
MAC: media access control
NIC: network interface card
OS: operating system
RAM: random access memory
ROM: read only memory
SQL: structured query language URL: uniform resource locator
VM: virtual machine
VPN: virtual private network Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry. In particular, although it may occur that many embodiments run on server computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

A "node" is an item with processing capability, access to at least one network, and a network address. Networked computer systems are examples of nodes. However, a networked computer system may include one or more nodes. For example, two server processes running on the same machine may each have control of a different respective NIC at a different respective network IP address, and thus operate as two different nodes. Similarly, two processes may share the same NIC hardware and the same IP address but operate from different ports as distinct nodes.

"Kernels" include operating systems, hypervisors, virtual machines, BIOS code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

"Service" means a consumable program offering in a cloud computing environment or other network environment.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as obtaining and culling a list of IP addresses from data logs or other representations of thousands of communications (which may be sessions or packets, for example), generating a graph of nodes, grouping nodes based on connection strength, and performing calculations to find connection strength, are understood herein as requiring and providing speed and accuracy that are not obtainable by human mental steps, in addition to their inherently digital nature (a human mind cannot interface directly with RAM or other digital storage to retrieve data). This is understood by persons of skill in the art, but others may sometimes need to be informed or reminded of the facts.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

Some examples herein discuss a local network and a remote network, some examples discuss a first network and a second network, some examples discuss a first network and an external network, and some discuss a customer network. In practice, although "local" and "remote" or "external" imply relative locations, the teachings from such examples may also apply in other situations. That is, in some cases, "local" and "remote" or "external" are not dispositive when applying a teaching but instead merely act as identifiers, akin to "first" and "second" or "one" and "another", because both networks involved can be physically remote, or be remote or external in terms of communication delays, from the location where the automatic identification of a candidate network is performed. By contrast, an "on-premises network" is a network on the premises of a particular entity and owned by that entity, and a "cloud network" is a network accessible through the internet which is owned by a cloud service provider and which provides compute, storage, and network capabilities to multiple entities. A "customer" network is generally a local or first network in terms of the teachings of the examples, but a candidate network may be part of a second customer network, e.g., networks of respective software development teams may both be customer networks but one is still the first network and the other is the candidate network.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as adding, administering, allocating, basing, calculating, carrying, crossing, culling, determining, displaying, enhancing, establishing, facilitating, generating, grouping, identifying, improving, including, moving, obtaining, selecting, subtracting, using, utilizing (and adds, added, administers, administered, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case. No claim covers a signal per se in the United States, and any claim interpretation that asserts otherwise is unreasonable on its face. Unless expressly stated otherwise in a claim granted outside the United States, a claim does not cover a signal per se.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se.

An "embodiment" herein is an example. The term "embodiment" is not interchangeable with "the invention".

Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment 102 computer system, also referred to as computational system or computing system 104 users 106 peripherals 108 network generally 110 processor 112 computer-readable storage medium, e.g., RAM, hard disks 114 removable configured computer-readable storage medium 116 instructions executable with processor; may be on removable media or in other memory (volatile or nonvolatile or both)

118 data 120 kernel(s), e.g., operating system(s), BIOS, device drivers 122 tools, e.g., anti-virus software, firewalls, packet sniffer software 124 applications, e.g., word processors, web browsers, spreadsheets 126 display screens 128 computing hardware not otherwise associated with a reference number 106, 108, 110, 112, 114

200 local computing environment, a.k.a. local or first network environment 202 network node generally 204 remote computing environment, a.k.a. remote or external network environment 300 on-premises network 302 server, e.g., dedicated server appliance, or server process plus associated shared hardware 304 internet 306 cloud provider, e.g., provider of platform-as-a-service or infrastructure-as-a-service services with corresponding hardware; 306 also refers generally to the cloud or other service(s) provided by the cloud provider 308 virtual machine 310 ownership boundary 502 line segment representing a network address which communicated with a node 602 line segment representing a network address which communicated with a node and which has at least a specified likelihood (i.e., probability) of future communication with that node 800 network or portion thereof for which communications are being analyzed, in a local environment 1000 candidate network, also referred to as candidate external network 1100 analysis node, namely, node which is configured to perform network-to-network communications analysis 1102 network-to-network communications analysis software 1104 list of IP addresses or other network addresses, e.g., pairs of IP address plus port number 1106 IP address (may be IPv4, IPv6, or another address that includes at least an internet protocol address)

1108 communications likelihood threshold 1110 connection strength threshold 1112 graph of connections between node(s) of first or local network and nodes in one or more other networks 1114 identification of network, e.g., a list or other data structure of node addresses, a list or other data structure of graph 1112 nodes, an IP address range, or another specification of which nodes belong to the network 1116 user interface 1118 mechanisms in user interface 1120 node identifier, e.g., a node network address or an alias for it 1122 scores used in grouping nodes into a candidate network 1124 node relevance score 1126 node stability score 1128 node density score 1130 communications likelihood for a particular remote node 1132 connection strength for a particular remote node 1200 virtual private network (VPN) software, e.g., network configuration software which accepts identification of VPN endpoint nodes, authentication software which allows endpoint nodes to authenticate one another, and encryption/decryption software which encrypts packet data before transmission of the packet data from an endpoint and decrypts packet data received at an endpoint 1202 bandwidth allocation software, e.g., network administration software which sets and enforces bandwidth quotas; may also log user activity 1204 traffic analysis software, e.g., network administration software which collects and analyzes session or flow or other traffic data, inspects data for traffic patterns, or monitors quality of service parameters 1206 firewall software 1208 packet sniffer software 1210 cloud management software e.g., network administration software which schedules initiation of cloud processing, monitors cloud operations, and schedules backup and maintenance operations 1212 utilities, e.g., network utilities such as nmap, tcpdump, iperf, ping, netcat, netstat, ipconfig 1300 example method for network-to-network communications analysis 1302 obtaining a list of IP addresses or other network addresses 1304 culling a list of addresses for those which are likely to also communicate in the future with a given node or node set; addresses correspond to respective nodes 1306 generating a node connections graph 1308 identifying nodes which have strong connections 1310 grouping nodes into a candidate network 1312 utilizing an identification of a candidate network, e.g., to serve as a basis for a new or expanded VPN, or to identify traffic data to be removed from data because it memorializes normal traffic when searching for anomalous traffic, or to influence bandwidth reallocations, or for other network administration tasks 1402 establish a VPN, i.e., configure at least two VPN endpoints in VPN software 1404 improving bandwidth allocation, e.g., make more bandwidth available for a connection to an external node identified by network-to-network communications analysis as strongly connected, or lower bandwidth allocation to a node identified by network-to-network communications analysis as unlikely to have future communications above threshold 1108

1406 bandwidth allocation, e.g., bandwidth cap or quota 1408 subtracting communications data from a set of communications data in order to facilitate detection of anomalous traffic 1410 data representing a set of communications 1412 detecting anomalous traffic 1414 moving a node from one network to another network 1416 adding a node to a network (a node may belong to more than one network at a time)

1418 selecting a node for inclusion in a candidate network based at least in part on whether communications with the node exceed a frequency threshold or a duration threshold or both 1420 communication frequency threshold or duration threshold, or both 1422 selecting a node for inclusion in a candidate network based at least in part on a machine learning result 1424 machine learning result from processing network node communications data; 1424 also refers to the machine learning process 1426 determining strength of connection between nodes 1428 calculating a score (stability, relevance, density, or mix thereof) for grouping nodes into a candidate network 1430 crossing an ownership boundary, e.g., from an node owned by entity X to a node owned by entity Y, where X and Y are legally distinct entities in the jurisdiction(s) in which they reside 1432 displaying an identification of a candidate network after grouping 1434 employing DNS lookup data to help identify a candidate network 1436 configuring, entering, or otherwise specifying cutoff values for communications likelihood, connection strength, grouping factor scores, which factors are used, or other parameters discussed herein Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated. A GUI may include integrated NUI or voice command functionality, for example. A GUI may be generated on a local desktop computer, or on a smart phone, for example, or it may be generated from a web server and sent to a client device 102.

Natural user interface (NUI) operation may use peripherals 106 or other hardware 128 for speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

System administrators, network administrators, software developers, engineers, and end-users are each a particular type of user 104. Automated agents, scripts, playback software, and the like acting on behalf of one or more people may also be users 104. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se under any claim pending or granted in the United States.

The medium 114 is configured with binary instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104.

In some embodiments, the system includes multiple computers connected by a network 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

Network Environments

Figure 2:
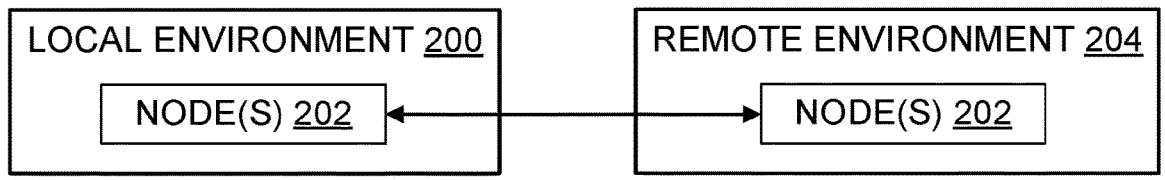
FIG. 2 is a block diagram illustrating aspects of two environments (one local and one remote) which each include one or more network nodes.
Figure 3:
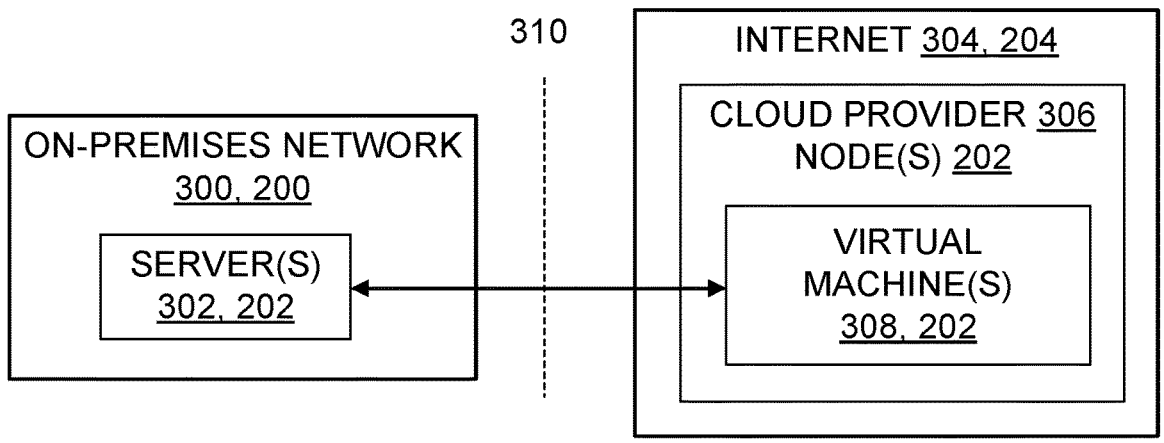
FIG. 3 is a block diagram illustrating aspects of two environments (one being an on-premises network and the other being the internet) which each include one or more network nodes, in the form of servers and virtual machines.
Figure 4:
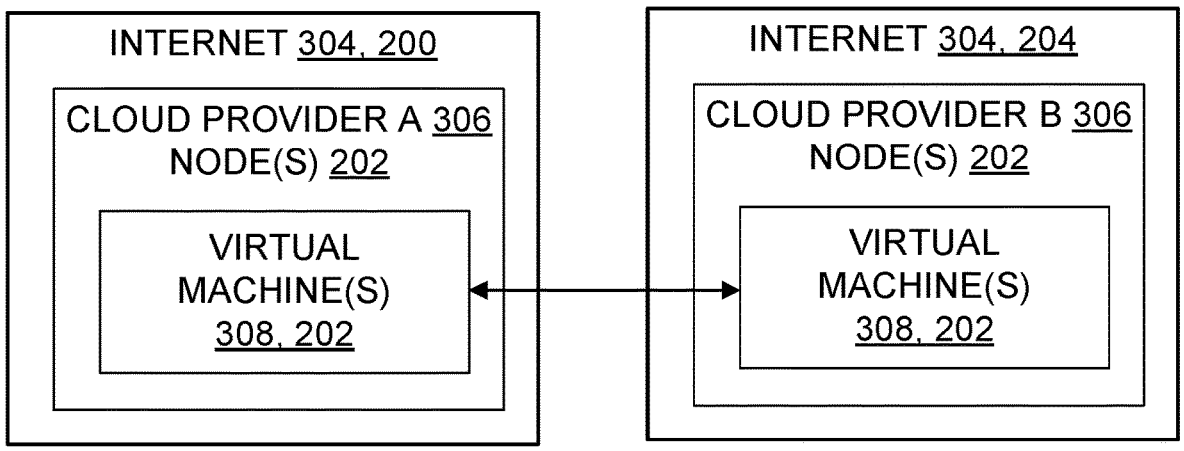
FIG. 4 is a block diagram illustrating aspects of two environments (two clouds) which each include network nodes in the form of virtual machines.

With reference to FIGS. 2, 3, and 4, an operating environment 100 may overlap or reside in one or more network environments, such as a local environment 200 or a remote environment 204. One of skill will agree that several variations are possible, including for example (a) a local environment 200 in general in communication with a remote environment 204 in general (illustrated in FIG. 2), (b) a local environment 200 in the form of an on-premises network 300 in communication with a remote environment 204 in general (not directly shown but covered by FIG. 2), (c) a local environment 200 in the form of an on-premises network 300 in communication with a remote environment 204 in the form of a cloud 306 (illustrated in FIG. 3), (d) a first environment 204 in the form of a first cloud 306 from provider A in communication with a second environment 204 in the form of a second cloud 306 from provider B (illustrated in FIG. 4), and (e) other variations. Although not directly shown in Figures, configurations with three or more network environments are also possible, and they can benefit from an application of teachings disclosed herein.

Variations in the kind of network node(s) present in a given network environment are also possible. Nodes 202 may include or utilize any computer system 102. In particular, a server 302 or a virtual machine 308 may operate as a network node 202. The locations of particular kinds of nodes 202 may also vary from the Figures. In particular, an on-premises network may contain one or more virtual machines 308, and a cloud provider 306 network may contain one or more servers 302.

Variations in ownership are also possible. Both environments 200, 204 may be owned by a single entity, or communications between the environments 200, 204 may cross an ownership boundary 310 in that one entity owns one of the environments and a different entity owns the other environment.

Communication Address Lists

Figure 5:
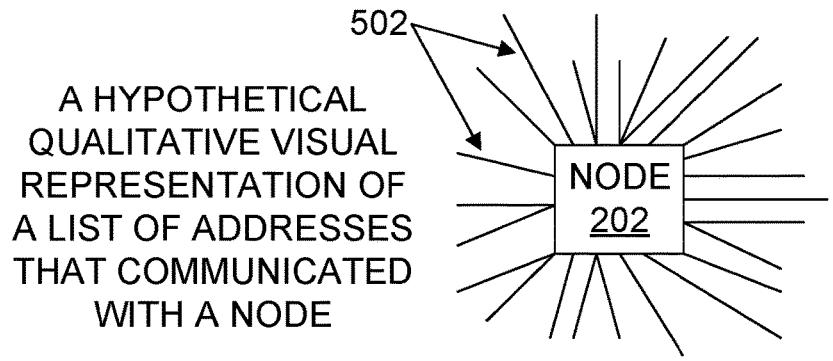
FIG. 5 is a visual representation of a list of addresses that have communicated with a particular node.
Figure 6:
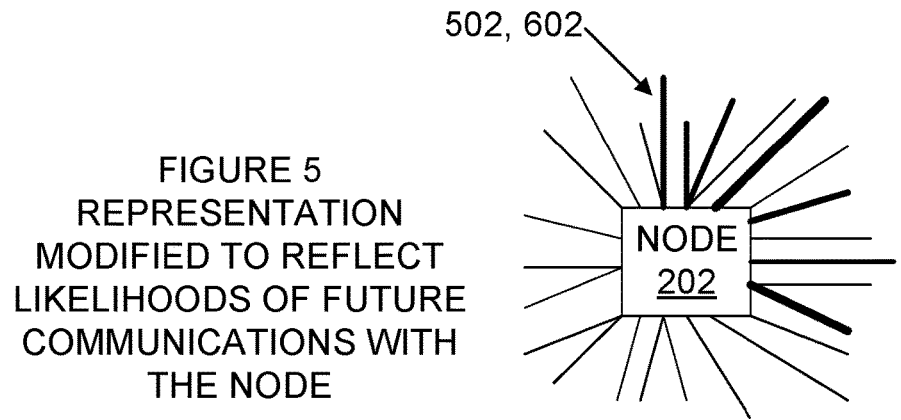
FIG. 6 is a visual representation of FIG. 5 modified to reflect likelihoods that respective addresses will communicate with the node in the future.
Figure 7:
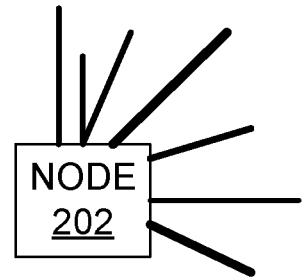
FIG. 7 is a visual representation of FIG. 6 modified to reflect culling of addresses based on comparison of the likelihoods to a threshold.
Figure 8:
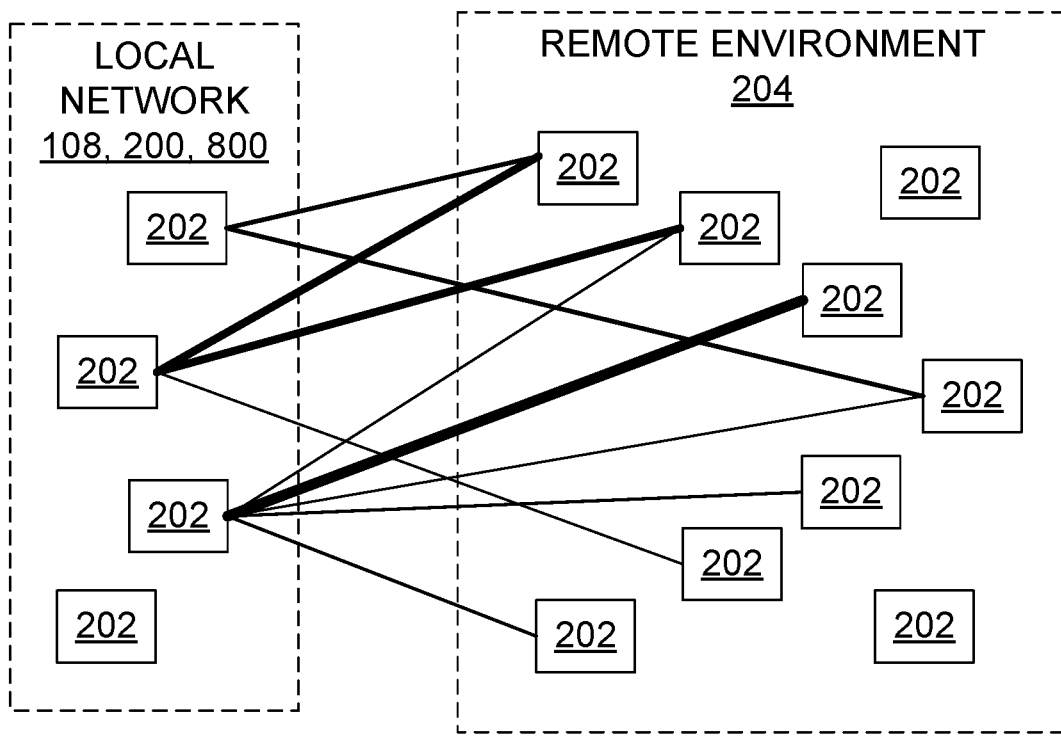
FIG. 8 is a visual representation of a graph data structure which memorializes connections between nodes of a local network and nodes in a remote environment.
Figure 9:
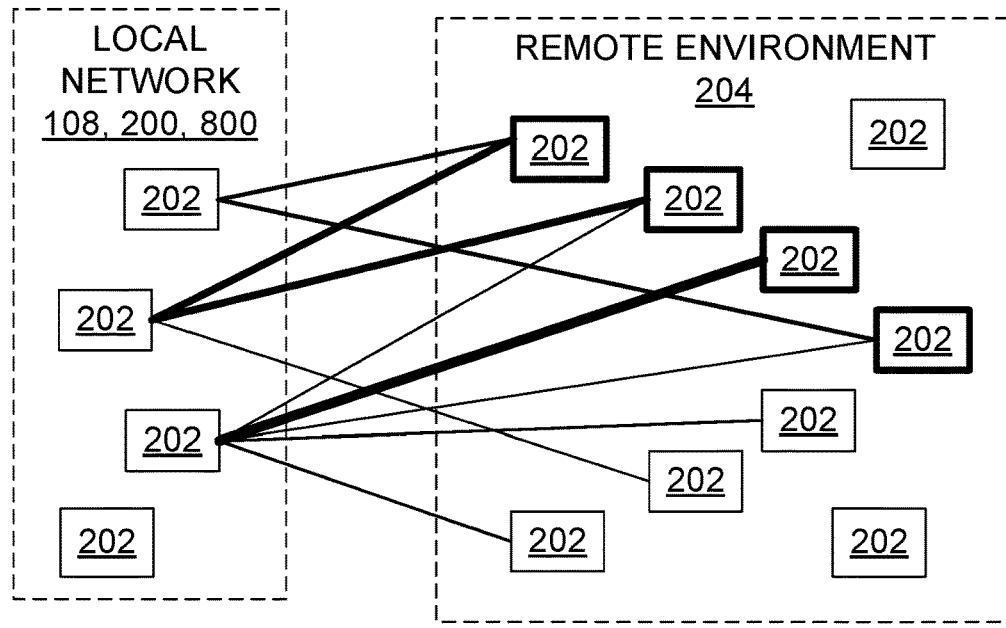
FIG. 9 is a visual representation of FIG. 8 modified to show which nodes in the remote environment are strongly connected to the local network.
Figure 10:
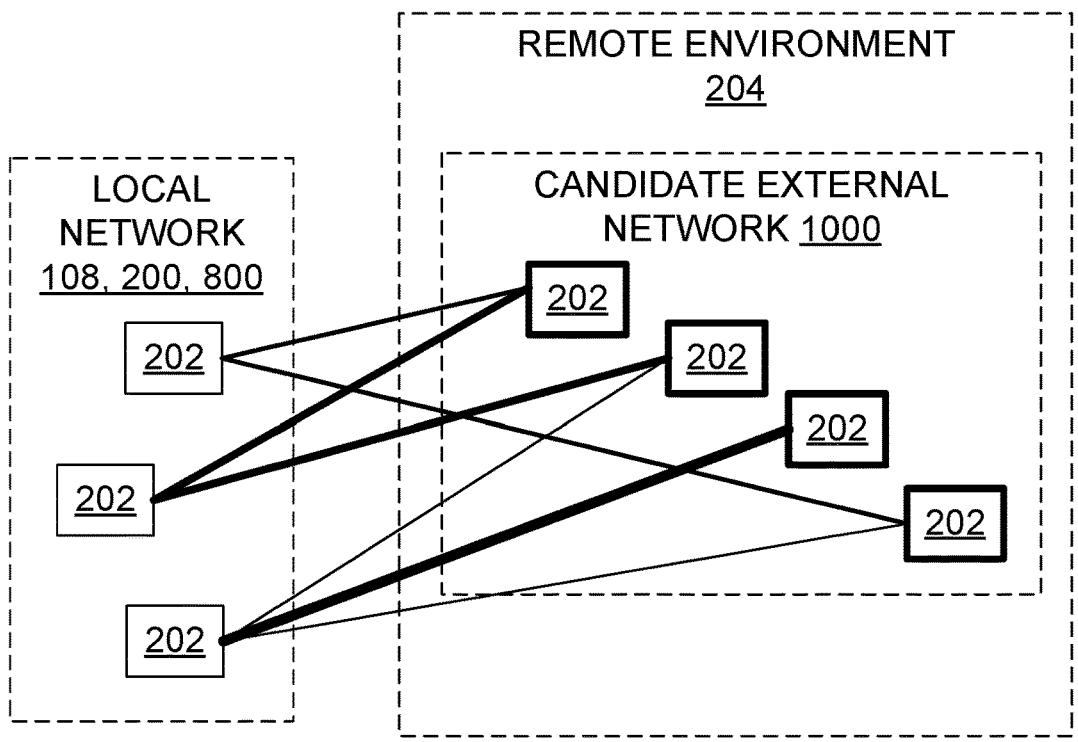
FIG. 10 is a visual representation of FIG. 9 modified to highlight nodes in the remote environment that are strongly connected to the local network and to group them into a candidate network.

FIGS. 5, 6, and 7 illustrate a culling usage of a list of addresses that communicated with a network node 202, and then FIGS. 8, 9, and 10 illustrate a connection graph built using the culled addresses. The illustrations in these Figures are visual; they are drawings, as opposed to source code listings. But one of skill will recognize that although a given implementation may include or present identical or similar drawings to users, the implementation will also include code-defined data structures corresponding to illustrations such as the ones provided here. For convenience, two such data structures are referred to herein as a "list" and a "graph". In practice, a list may be implemented as a linked list, array, tree, table, set API, collection API, object, or one or more other data structures. Likewise, a graph may be implemented using pointers, tables, objects, or one or more other data structures.

FIG. 5 illustrates visually a list of network addresses that have communicated with a node. A given "network address" may be a single value, such as an IP address, or it may be a tuple, such as an IP address paired with a port number. In FIG. 5, each line segment (including those expressly denoted at 502 as examples) extending from the node 202 represents a different network address. The lengths of the line segments and their directions in the drawing are not significant except to the extent that they help distinguish one address (line segment) from another address (line segment). The number of line segments shown in FIG. 5 is not intended to limit the number of addresses listed for a node in an implementation. In practice, some nodes will have zero addresses in the list of communication addresses, while the number of addresses that have communicated with other nodes may range upward into the hundreds or thousands, or even higher.

In FIG. 6, the illustration in FIG. 5 has been modified to reflect calculations that assigned a likelihood of future communications to each address, that is, a probability that the node will communicate in the future with another node at the address in question. In the FIG. 6 drawing, greater likelihood of future communication is shown by thickening of the line segment 602 that represents the address. In an implementation, a numeric weight or probability value or an enumeration value (e.g., low, medium, or high) would be stored in a data structure with the address to represent the likelihood of future communications between the address and the node (which is also represented by a network address).

In FIG. 7, a likelihood threshold has been applied as a cutoff, in that addresses whose likelihood of future communications with the node is below the threshold have been removed from the drawing. In an implementation, the addresses whose likelihood is below the threshold might be removed from the list data structure, or they might remain in the list but be marked as unlikely to have future communications. Marking may be accomplished with bitflags or other variables. This cutoff operation is referred to as "culling" addresses. In FIG. 7, different likelihoods are still represented by different line segment thicknesses, but in an implementation, culled and kept addresses would not necessarily retain their respective likelihoods. They might not have any respective likelihood value stored at all after culling; they could simply be kept in a list of culled addresses.

FIG. 8 illustrates a graph connecting nodes in two network environments. Different connection strengths are represented in the FIG. 8 drawing by different line segment thicknesses (thicker means stronger), but in an implementation the nodes and connections are not necessarily depicted visually, as line segments or otherwise, and they will be implemented using data structures. A graph node can be implemented, e.g., as a collection, set, list, table, etc. of structs or objects, with each struct or object having a list of neighbors and content specific to the graph such as the represented node's network address. Each neighbor could be implemented as a pointer or index to another node, plus a numeric or enumeration value representing the strength of the connection.

In the FIG. 8 example, the local environment is labeled as a "local network" but the remote environment is not labeled as a network. This reflects the expectation that in many situations the membership of a network containing the one or more local nodes of interest will be known, whereas network membership information for the remote nodes will be incomplete or entirely missing when external nodes are initially identified via address lists. Indeed, even after one or more of the remote environment's nodes are grouped into a candidate network (e.g., as in FIG. 10), information about the membership of those grouped nodes in other networks will not necessarily be known to the entity that did the grouping to define the candidate network.

In FIG. 9, a connection strength threshold has been applied as a cutoff, in that nodes whose communications connection strength with a given node is above the threshold are shown with thickened outlines. In FIG. 10, the nodes of the remote environment that lack thickened outlines have been removed from the drawing. In an implementation, the nodes whose connection strength is below the threshold might be removed from the graph, or they might remain in the graph but be marked as lacking sufficient connection strength to be part of the candidate network 1000. Marking may be accomplished with bitflags or other variables.

Analysis Node

Figure 11:
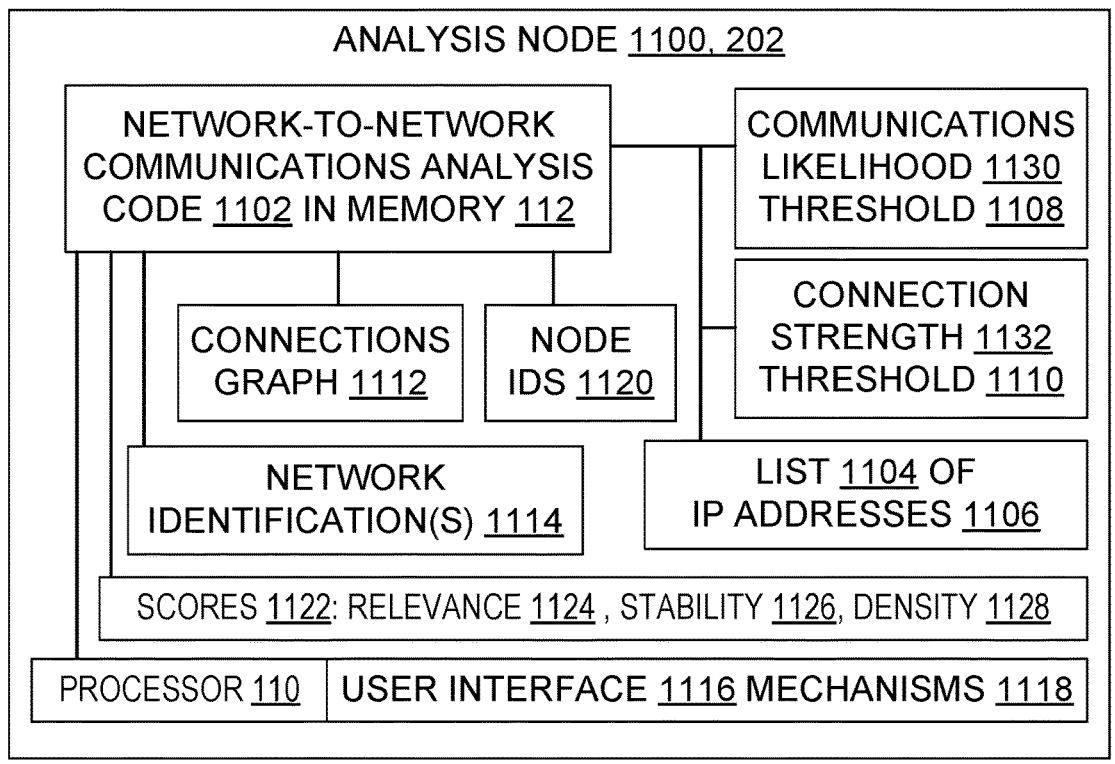
FIG. 11 is a block diagram illustrating aspects of an analysis node, including functionality for analyzing network-to-network communications to aid network administration.

FIG. 11 illustrates an analysis node 1100. This may be one of the nodes of the local network whose connections are being analyzed, or not. Communications data may be transferred to an admin machine for analysis, for example, with the admin machine not being part of the local network whose connections are being analyzed.

The illustrated analysis node 1100 includes network-to-network communications analysis code 1102 which performs operations disclosed herein such as culling a list of network addresses based on the probability of future communications and grouping nodes (network addresses) into a candidate network based on their connection strength with local nodes of interest. The network-to-network communications analysis software 1102 may use, or may generate and use, a connections graph 1112 like the one illustrated in FIGS. 8-10. In the graph, and in a node list 1104, nodes 202 may be identified by node identifiers 1120 such as network addresses, pointers into a data structure, or an index into a data structure. Networks may be identified by IDs 1114 such as names, address ranges, or a list of member nodes. The network-to-network communications analysis software 1102 may use cutoff values, such as a communications likelihood threshold 1108, a connection strength threshold 1110, or grouping scores 1122 such as a relevance score 1124, a stability score 1126, and a density score 1128. Users may interact with the network-to-network communications analysis software 1102 through an interface (command line or GUI or otherwise) 1116, which may provide mechanisms (text input, entry boxes, sliders, default value acceptance dialogs, etc.) 1118 to control cutoff values for the future communications likelihood, node grouping connection strength, and node grouping scores 1122.

Figure 12:
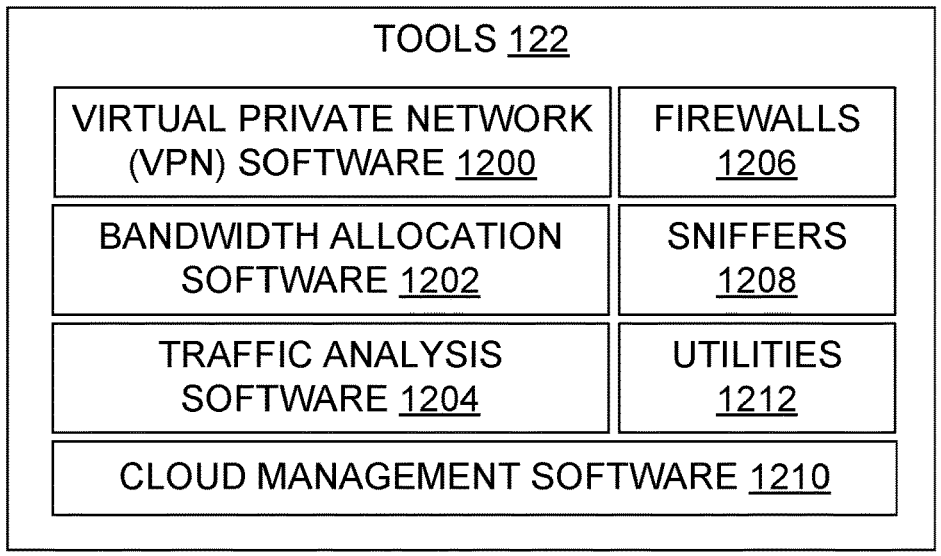
FIG. 12 is a block diagram illustrating some network administration tools.

As illustrated by FIGS. 1 and 12, but for clarity of illustration not shown in FIG. 11, an analysis node 1100 and other nodes may also include tools 122. For example, tools on a given node or nodes may include VPN software 1200, bandwidth allocation management software 1202, network traffic analysis software 1204, firewall software 1206, packet sniffer software 1208, cloud management software 1210, and network utilities software 1212. In each case, underlying hardware is effectively used by and provided with such software, and hardware is understood to be inherently present with the software.

Systems

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, or data structures, for instance, and may otherwise depart from the examples provided herein.

Some embodiments use or provide a system for network-to-network communications analysis in a collection of networks. An example system includes an analysis node 1100, with the analysis node including at least one processor 110, a memory 112 in operable communication with the processor, and network-to-network communications analysis code 1102 residing in the memory. Upon execution by the processor, the code 1102 performs a process that includes (a) obtaining a list of IP addresses 1106 which have communicated with nodes 202 in a first network, (b) culling from the list of IP addresses a set of external nodes which have at least a specified likelihood 1108 of future communications with the first network, (c) generating a graph 1112 which connects one or more nodes of the first network with one or more of the external nodes, (d) identifying by use of the graph one or more external nodes which have at least a specified strength 1110 of connection with the first network, (e) grouping at least a portion of the external nodes into a candidate external network 1000, and (f) displaying an identification 1114 of the candidate external network. In some variations, network addresses other than, or in addition to, IP addresses are used.

In some embodiments, communication events, network usage measurements, and other data used for calculating future communications likelihoods or connection strengths or node grouping scores can be obtained, e.g., by using routines and data structures like those utilized in administrator tools, performance tools, or utilities 1212, e.g., Wireshark®, Windows Performance Monitor, Windows Remote Server Administration Tools, TCP View, Windows Snare, Windows Process Monitor, PsExec, netstat, Ping, tracert, and the like in Microsoft Windows® environments, and mpstat, iostat, vmstat, sysstat, and the like in UNIX®-like environments (Wireshark® is a mark of Wireshark Foundation, Inc., Windows® is a mark of Microsoft Corporation; UNIX® is a mark of X/Open Co. Ltd. Corp.).

In some embodiments, culling a set of external nodes includes using a machine learning result that is based at least partially on a history of external node communications with the first network. The machine learning may be performed by part of the network-to-network communications analysis code 1102 using machine learning algorithms and data structures such as decision trees, Bayes classifiers, least squares regression, logistic regression, support vector machines, Bayesian averaging and other ensemble methods, clustering algorithms, and component analysis. A first portion of communications records can serve as training data, and a second portion documenting later communications can serve as test data to verify that the machine learning algorithms have indeed predicted, from the training data and with sufficient accuracy, e.g., 70% accuracy or a user-specified cutoff, whether the future communications in the second portion would occur.

In some embodiments, nodes in the first network include virtual machines 308 in a cloud network. In some embodiments, the analysis node resides in the first network. In some embodiments, the external nodes include servers which communicate with the first network.

In some embodiments, the system further includes a user interface 1116 in operable communication with the network-to-network communications analysis code 1102 previously described. In some of these, the user interface includes least one of the following mechanisms 1118: a mechanism for a user to control a node relevance threshold 1124 that is used by the network-to-network communications analysis code 1102 when grouping external nodes into the candidate external network; a mechanism for a user to control a node address stability threshold 1126 that is used by the network-to-network communications analysis code when grouping external nodes into the candidate external network; a mechanism for a user to control a node density threshold 1128 that is used by the network-to-network communications analysis code when grouping external nodes into the candidate external network; a mechanism for a user to choose one or more factors to use in determining connection strength 1132 for connections to the first network; a mechanism for a user to choose one or more factors to use in culling the set of external nodes from the list of IP addresses. Mechanisms 1118 may be implemented using scripts, command line parsers, input boxes, sliders, menus, dialogs, default values, and other familiar UI construction widgets or tools.

As to grouping factors, in this example, node address stability measures how often a node's network address changes, and presumes that the node is also identified by some other unchanged identifier, such as a processor serial number, MAC address, a fixed relative position in a list or hierarchy, digital certificate, or the like. In this example, node relevance measures factors such as how many nodes communicate with a given node, in absolute terms or relative to other nodes on which data is being analyzed. In this example, node density measures how many nodes in a set communicate with a node of interest. Density may also measure how tightly clustered communications are within a network environment.

In some embodiments, the system further includes virtual private network establishment software 1200 which is in operable communication with the network-to-network communications analysis code 1102 and is configured to establish a virtual private network between the first network and at least one external node of the candidate external network. Familiar VPN software 1200 can be used, under guidance or direct control that is provided by the network-to-network communications analysis code 1102.

Methods

Figure 13:
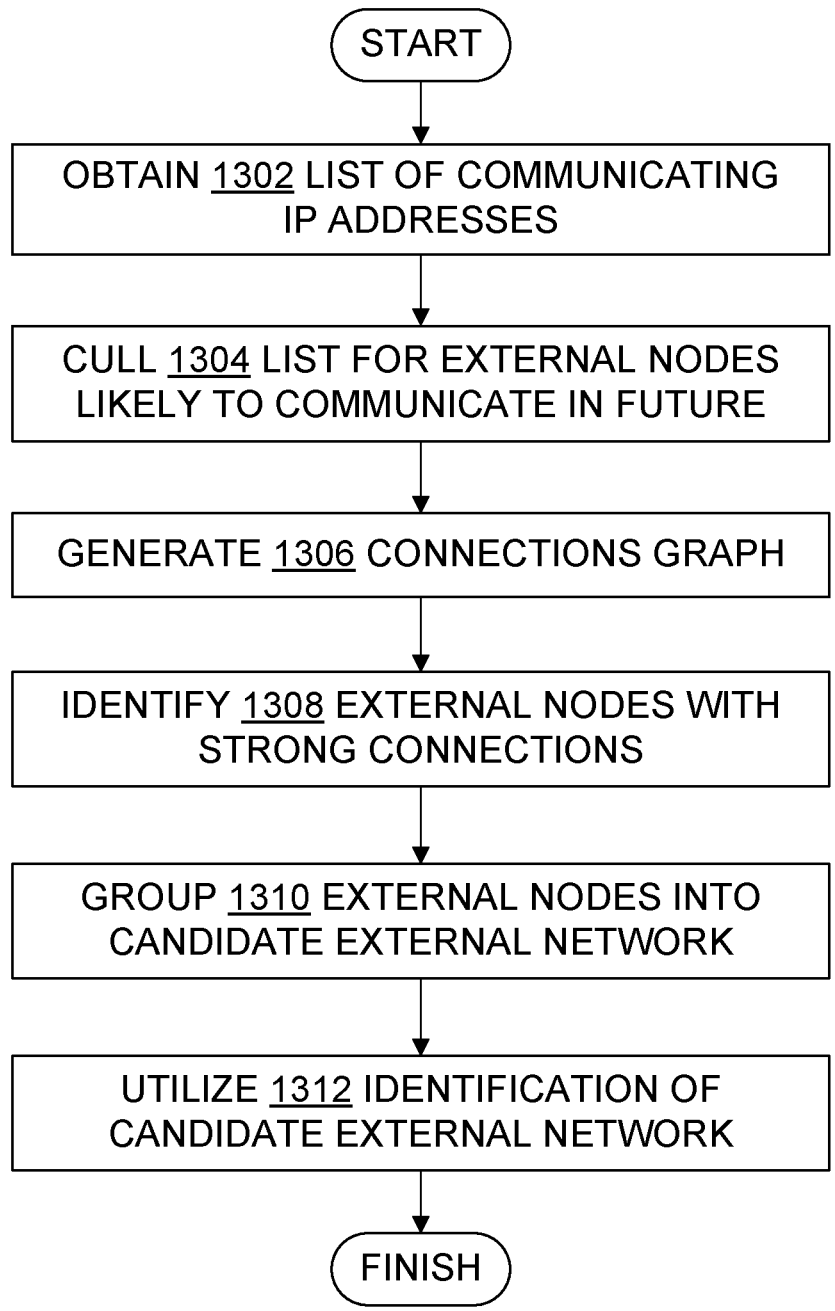
FIG. 13 is a flowchart illustrating a method for analyzing network-to-network communications and improving network administration.

FIG. 13 illustrates an analysis method 1300 which is an example of methods performed by network-to-network communications analysis code 1102. This method obtains 1302 a list of network addresses which communicate with a local node of interest. This may be accomplished by extracting address data from communication logs, for example. Data may be further analyzed as either incoming or outgoing, or analyzed in other categories such as type of traffic, time of day, and so on.

Then this method culls 1304 from the list of all obtained communications a list of addresses representing nodes that are likely to communicate in the future with the local node of interest. This may be accomplished by disregarding or deleting nodes which have fewer than N communications, or nodes which are not in the top X % of nodes when they are ranked by number of communications, for example, where X is specified by default or by user input.

Then this method generates 1306 a connections graph. This may be done by familiar graph generation tools and techniques which operate on the culled 1304 list.

Then this method identifies 1308 external nodes which have relatively strong connections to the local node(s) of interest. Connection strength may be defined using one or more of relevance, stability, and density scores, as discussed elsewhere herein.

Then this method groups 1310 the most strongly connected external nodes into a candidate network. As noted elsewhere herein, those nodes will generally also belong to other networks whose extent, and possibly existence, is not necessarily known to the network-to-network communications analysis code 1102. However, when it is determined that the external network does match a pre-existing network, that can strengthen a recommendation to include all nodes of the pre-existing network in the candidate network for which a VPN connection establishment is recommended by the code 1102.

Finally, the method utilizes 1312 the identification of the candidate network, e.g., by displaying it to an administrator for study and possible further use, by recommending or forming a VPN between the candidate network and the local nodes, by reallocating bandwidth between the candidate network and the local nodes, by treating traffic between the candidate network and the local nodes as non-anomalous for security purposes, or by otherwise utilizing the candidate network identification to improve communications administration.

Figure 14:
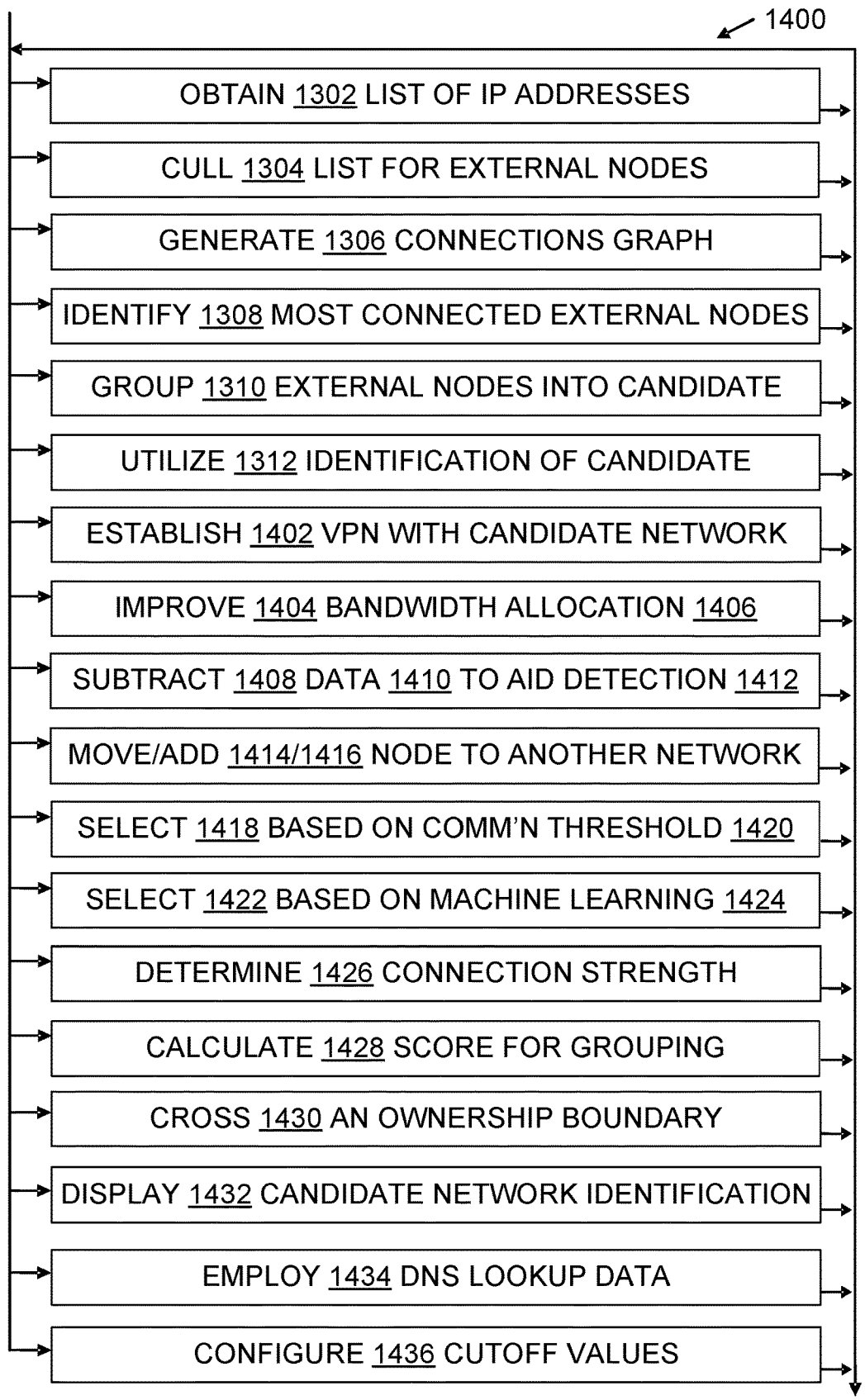
FIG. 14 is a flowchart further illustrating steps in some methods for analyzing network-to-network communications and improving network administration.

FIG. 14 illustrates some method embodiments in a general flowchart 1400. Technical methods shown in the Figures or otherwise disclosed will be performed automatically, e.g., by network-to-network communications analysis code 1102, unless otherwise indicated. Methods may also be performed in part automatically and in part manually to the extent action by a human administrator or other human person is implicated, e.g., a person may command that a method consistent with flowchart 1300 or flowchart 1400 be performed for a particular local node or set of nodes or customer network. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIG. 14. Steps may be performed serially, in a partially overlapping manner, or fully in parallel. The order in which flowchart 1400 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Some embodiments use or provide a computer-implemented method for improving network-to-network communications in a collection of networks. One example method includes: for each of a plurality of nodes in a first network, automatically obtaining 1302 a list of network addresses which have communicated with the node; for each of at least a subset of the plurality of nodes in the first network, culling 1304 the node's list of network addresses for additions to a set of external nodes which have a likelihood of future communications with the node of the first network that meets or exceeds a predefined likelihood threshold; automatically generating 1306 a graph which connects one or more nodes of the first network with one or more of the external nodes; based on at least the graph, automatically identifying 1308 external nodes which have a strength of connection with the first network that meets or exceeds a predefined connection strength threshold; automatically grouping 1310 at least a portion of the external nodes into a candidate external network; and utilizing 1312 an identification of the candidate external network to improve communications between the first network and the candidate external network.

In some embodiments, utilizing 1312 an identification of the candidate external network to improve communications between the first network and the candidate external network includes establishing 1402 a virtual private network which carries traffic between the first network and the candidate external network, thereby improving communication security. In some, utilization 1312 includes improving 1404 an allocation 1406 of bandwidth which carries traffic between the first network and the candidate external network, e.g., by giving more bandwidth to traffic between the first network and the candidate network, or by decreasing bandwidth available to other traffic, or both. In some embodiments, utilization 1312 includes subtracting 1408 data 1410 that is based on traffic between the first network and the candidate external network from a larger set of data that is based on all traffic with the first network, thereby facilitating detection 1412 of anomalous traffic by reducing the amount of background noise that could hide anomalous traffic. In some embodiments, utilization 1312 includes moving 1414 at least one node of the candidate external network from the candidate external network into the first network, or otherwise adding 1416 the external node, thereby enhancing first network administration of communication with the moved or added node or nodes.

In some embodiments, culling 1304 to get a set of external nodes includes selecting 1418 external nodes at network addresses whose frequency of communications with the node of the first network meets or exceeds a communication frequency threshold 1420 derived from a history of communications with the node of the first network. In some, culling 1304 includes selecting 1418 external nodes at network addresses whose representative duration of individual communication with the node of the first network meets or exceeds a communication duration threshold 1420 derived from a history of communications with the node of the first network. In some, culling 1304 includes selecting 1422 external nodes at network addresses by using machine learning 1424 that is based at least partially on a history of communications with the node of the first network.

In some embodiments, identifying 1308 external nodes which have a strength of connection with the first network that meets or exceeds a predefined connection strength threshold includes determining 1426 connection strength based at least in part on at least one of the following: consistency as to which communication protocol is used in connections; duration of periods in which no connection is active; relative amount of time in which no connection is active; bandwidth used by connections. More consistency, longer duration, less inactive time, and more bandwidth used each means greater strength.

In some embodiments, grouping 1310 at least a portion of the external nodes includes calculating 1428 a node relevance score based on a relative amount of communications with the first network that are conducted with a particular external node. In some, grouping 1310 includes calculating 1428 a stability score based on how frequently external node addresses change. In some, grouping 1310 includes calculating 1428 a density score based on how many external nodes in a candidate group have strong connections to the first network.

In some embodiments, the first network is owned or controlled by a first entity and the candidate external network includes at least one node that is owned or controlled by a second entity that is legally distinct from the first entity. In such cases, communications between the external network and the local node cross 1430 an ownership boundary.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as analysis software 1102, connections graph 1112, address list 1104, candidate network identification 1114, and cutoffs such as items 1108, 1110, 1124, 1126, 1128, in the form of data 118 and instructions 116, read from a removable medium 114 and/or another source such as a network connection, to form a configured medium. The configured medium 112 is capable of causing a computer system to perform technical process steps for identifying and utilizing candidate networks as disclosed herein. The Figures thus help illustrate configured storage media embodiments and process embodiments, as well as system and process embodiments. In particular, any of the process steps illustrated in FIG. 13, FIG. 14, or otherwise taught herein, may be used to help configure a storage medium to form a configured medium embodiment.

Some examples use or provide a computer-readable storage medium 112 configured with data 118 and instructions 116 which upon execution with a processor 110 perform a method for improving network-to-network communications in a collection of networks (e.g., one or more network environments), the method including automatically culling 1304 a list of IP addresses which have communicated with one or more nodes in a first network, thereby getting a set of external nodes which have a likelihood of future communications with the first network that meets or exceeds a predefined likelihood threshold; automatically generating 1306 a graph which connects one or more nodes of the first network with one or more of the external nodes; based on at least the graph, automatically identifying 1308 external nodes which have a strength of connection with the first network that meets or exceeds a predefined connection strength threshold; automatically grouping 1310 at least a portion of the external nodes into a candidate external network; and displaying 1432 an identification of the candidate external network, thereby facilitating an improvement in networking between the first network and the candidate external network.

In some embodiments, culling 1304 to get a set of external nodes includes at least one of the following: selecting 1418 external nodes at IP addresses whose frequency of communications with the node of the first network meets or exceeds a specified communication frequency threshold, or selecting 1418 external nodes at IP addresses whose representative duration of individual communication with the node of the first network meets or exceeds a specified communication duration threshold.

In some embodiments, the analysis code 1102 further includes a user interface 1116 having at least one of the following: an interface to code for establishing 1402 a virtual private network which carries traffic between the first network and the candidate external network; an interface to code for improving 1404 an allocation of bandwidth which carries traffic between the first network and the candidate external network; an interface to code for detecting 1412 anomalous traffic from or with the first network, or both; an interface to code for adding 1416 at least one node of the candidate external network to the first network.

In some embodiments, automatically grouping 1310 at least a portion of the external nodes into a candidate external network includes finding a range of IP addresses in which a density of IP addresses that communicate with the first network meets or exceeds a specified IP address density. For instance, at least 30% of the addresses in the range communicate with the first network, in one example. In another example, the cutoff is 40%, and in other examples the cutoff is user-specified through the interface 1116.

In some embodiments, automatically grouping 1310 at least a portion of the external nodes into a candidate external network includes grouping virtual machines which execute on an infrastructure provided by a cloud service provider.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

Some embodiments reduce attack surface by reducing organization internal traffic that goes over the internet 304.

Some embodiments leverage the broad visibility provided by the cloud, DNS lookup data and grouping algorithms to find possible connections between a customer's cloud environment and a distant network, which may be on the customer's premises or cloud hosted. In some examples, a recommendation including identification of the candidate network is generated in four phases:
1. Routine analysis on the VM level: what is typical or regular?
2. Network routine: what is typical or regular?
3. Distant network identification and stability
4. Customized recommendation Some embodiments find networks by searching for remote servers with close IP addresses, namely, within a user-specified or default distance of the address communicating with the customer's network. "Close" may be for example within an 8-bit subnet range, or 12-bit range, or the like. Some embodiments look at address ranges of between 100-1000 contiguous IP addresses, considering them to be "close", because they represent most LAN networks and private organizational networks, consistent with Classless Inter-Domain Routing.

The "density" of a possible network, which is the number of remote servers divided by the number of addresses in the entire IP range for the possible network, is considered in some embodiments when calculating the overall score of the remote network. Some embodiments combine together servers which communicate with the same subset of machines on the customer's network, taking into account the different measures for the strength of this communication discussed herein. One can conclude that a range of IP addresses is probably a network (namely, all machines with those IPs can communicate with internal IPs), and therefore a VPN connection should be considered. One can also take the view that a network is a group of computers (such as one specified in/vms/nodes in some systems) which communicate with one another via a private network.

As to a phase directed to routine analysis on the VM level, for each VM of a customer deployment, machine learning and data mining algorithms are used in some embodiments to compile 1302 a list 1104 of remote IPs which communicate routinely (i.e., regularly or often) with the VM. Each remote IP is coupled with a routine score 1130, which measures the likelihood that the VM will communicate with that remote IP in the month (for example; other periods than a month may also be used) following the learning period. Remote IPs with a routine score that crosses a threshold 1108 are considered external servers.

As to a network routine phase, a network graph 1112 is generated 1306. The graph contains the customer's VMs and their corresponding external servers. Some embodiments know which customer machines are in the same network as one another in advance of this phase; some embodiments discover the customer (a.k.a. local or first) network in addition to discovering external nodes. Graph based search algorithms are then used to find 1308 external servers which communicate with a large group of VMs in the network. Using this approach, one gets a measure 1132 of the strength of connection between a network and an external server. In this example, this measure depends on the amount of traffic between the network and the external server, the number and centrality of the corresponding VMs in the network and the properties of communication, such as its protocols and packet distribution over time.

As to a phase directed to distant network identification and stability, in this example external servers from the previous phase are combined 1434 with DNS lookup data, to find groups of external servers which might represent an external network. Addresses that belong to the same domain per DNS lookup data may be included in the candidate network, even if their connection strength data does not otherwise indicate a sufficiently strong connection, because they are likely to be part of the same third party network as one another and likely to step in for one another when other servers in the domain are heavily loaded. This may be done using clustering techniques and IP grouping algorithms, in order to find dense IP ranges which represent a large number of external servers with a high routine score.

In this example, for each external network, the computations provide certain scores 1122, including: (a) Relevance, based on combining the number and centrality of VMs that communicate with the external network; (b) Stability, as a measure of the frequency in which servers change IP addresses in the external network; and (c) Density, as a measure of how many of the servers within the external network have a high routine score as external servers.

As to a customized recommendation phase, in this example each external network 1000 from the previous phase is a possible recommendation for a VPN connection that will improve network security. In some examples, a customer can adjust the recommendation findings by configuring 1436 the thresholds of the relevance, stability and density scores.

Notice that in this example there are two types of recommendations. With a Cross Customer recommendation, the networks belong to different customers. The information about the external network can be fetched in part from DNS data. With an In Customer recommendation, both networks (the internal/first/local network and the external network)

belong to the same customer organization. In this case, more data can be presented to the customer. For example, if both networks are in the same cloud and the analysis code 1102 has administrative access to both networks, then the subscriptions and their owners will be accessible to the code 1102 and can be mutually presented to both network owners.

As another example, consider an on-premises environment that is constantly or often communicating with a cloud environment, consistent with FIG. 3. For instance, servers in the on-premises environment might communicate with SQL database processing nodes in the cloud. In this scenario, a service based on the analysis code 1102 recognizes the presence of constant or near-constant communication between an on-premises environment and a public cloud environment. This type of communication is not secured, because the traffic is travelling over the internet 304, so a more secure solution would tie the two different networks together into a bigger network. This would limit the communication's exposure, by preventing it from travelling unsecured on the broader web. The service will identify this type of communication, recommend to the administrator 104 that the two networks be consolidated into a single network, and apply techniques to do that, e.g., by establishing a VPN.

As another example, consider a case in which two public cloud environments are communicating, consistent with FIG. 4. In this scenario, the analysis code 1102 service identifies constant or frequent communication between two public cloud environments (in a variation, communication could be within a single cloud). This type of communication is not secured, because the traffic is travelling over the internet, so a more secure solution would tie the two different networks together, into a bigger network. The service will identify this type of communication, and recommend to the administrator 104 that the two networks be consolidated into a single network by establishing a VPN linking or entirely containing them.

As another example, consider the challenge of anomaly threat detection. In this scenario, the analysis code 1102 identifies communication between two environments (e.g., on-premises and on-premises, or on-premises and cloud, or cloud and cloud). Then the analysis code 1102 identifies a normal behavior profile for the type of IP addresses that are communicating with a specific service, and tags or otherwise categorizes them as ones that belong to the same organizational entity. Once this normal behavior profile is in place, anomaly detection software 1204 can be configured to alert on IP addresses which are not part of the organizational baseline but are still communicating with a specific service in the local network.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIGS. 13 and 14 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method for improving network-to-network communications in a collection of networks, the method comprising:
for each of a plurality of nodes in a first network, automatically obtaining a list of network addresses which have communicated with the node, wherein a network address comprises an IP address;
for each of at least a subset of the plurality of nodes in the first network, culling the node's list of network addresses for additions to a set of external nodes which have a likelihood of future communications with the node of the first network that meets or exceeds a predefined likelihood threshold, wherein the likelihood includes at least one of: a numeric weight, a probability value, or an enumeration value;
automatically generating a graph which connects one or more nodes of the first network with one or more of the external nodes;
based on at least the graph, automatically identifying external nodes which have a strength of connection with the first network that meets or exceeds a predefined connection strength threshold;
automatically grouping at least a portion of the external nodes into a candidate external network; and
utilizing an identification of the candidate external network to improve communications between the first network and the candidate external network.

2. The method of claim 1, wherein utilizing an identification of the candidate external network to improve communications between the first network and the candidate external network comprises at least one of the following:
establishing a virtual private network which carries traffic between the first network and the candidate external network, thereby improving communication security;
improving an allocation of bandwidth which carries traffic between the first network and the candidate external network;
subtracting data that is based on traffic between the first network and the candidate external network from a larger set of data that is based on traffic with the first network, thereby facilitating detection of anomalous traffic;
moving at least one node of the candidate external network from the candidate external network into the first network, thereby enhancing first network administration of communication with the moved node or nodes; or
adding at least one node of the candidate external network into the first network, thereby enhancing first network administration of communication with the added node or nodes.

3. The method of claim 1, wherein culling to get a set of external nodes comprises at least one of the following:
selecting external nodes at network addresses whose frequency of communications with the node of the first network meets or exceeds a communication frequency threshold derived from a history of communications with the node of the first network;
selecting external nodes at network addresses whose representative duration of individual communication with the node of the first network meets or exceeds a communication duration threshold derived from a history of communications with the node of the first network;
selecting external nodes at network addresses by using machine learning that is based at least partially on a history of communications with the node of the first network.

4. The method of claim 1, wherein identifying external nodes which have a strength of connection with the first network that meets or exceeds a predefined connection strength threshold comprises determining connection strength based at least in part on at least one of the following:
consistency as to which communication protocol is used in connections;
duration of periods in which no connection is active;
relative amount of time in which no connection is active;
bandwidth used by connections.

5. The method of claim 1, wherein grouping at least a portion of the external nodes comprises calculating a node relevance score based on a relative amount of communications with the first network that are conducted with a particular external node.

6. The method of claim 1, wherein grouping at least a portion of the external nodes comprises calculating a stability score based on how frequently external node addresses change.

7. The method of claim 1, wherein grouping at least a portion of the external nodes comprises calculating a density score based on how many external nodes in a candidate group have strong connections to the first network.

8. The method of claim 1, wherein the first network is owned or controlled by a first entity and the candidate external network includes at least one node that is owned or controlled by a second entity that is legally distinct from the first entity.

9. A system for network-to-network communications analysis in a collection of networks, the system comprising:
an analysis node, the analysis node comprising:
at least one processor;
a memory in operable communication with the processor; and
network-to-network communications analysis code residing in the memory and which upon execution by the processor performs a process that includes (a) obtaining a list of IP addresses which have communicated with nodes in a first network, (b) culling from the list of IP addresses a set of external nodes which have at least a specified likelihood of future communications with the first network, wherein the likelihood includes at least one of: a numeric weight, a probability value, or an enumeration value, (c) generating a graph which connects one or more nodes of the first network with one or more of the external nodes, (d) identifying by use of the graph one or more external nodes which have at least a specified strength of connection with the first network, (e) grouping at least a portion of the external nodes into a candidate external network, and (f) displaying an identification of the candidate external network.

10. The system of claim 9, wherein culling a set of external nodes comprises using machine learning that is based at least partially on a history of communications with the first network.

11. The system of claim 9, wherein nodes in the first network comprise virtual machines in a cloud network.

12. The system of claim 9, further comprising a user interface in operable communication with the network-to-network communications analysis code, the user interface comprising at least one of the following:
- a mechanism to control a node relevance threshold that is used by the network-to-network communications analysis code when grouping external nodes into the candidate external network;
- a mechanism to control a node address stability threshold that is used by the network-to-network communications analysis code when grouping external nodes into the candidate external network;
- a mechanism to control a node density threshold that is used by the network-to-network communications analysis code when grouping external nodes into the candidate external network;
- a mechanism to choose one or more factors to use in determining connection strength for connections to the first network;
- a mechanism to choose one or more factors to use in culling the set of external nodes from the list of IP addresses.

13. The system of claim 9, wherein the analysis node resides in the first network.

14. The system of claim 9, wherein the external nodes include servers which communicate with the first network.

15. The system of claim 9, further comprising virtual private network establishment software which is in operable communication with the network-to-network communications analysis code and is configured to establish a virtual private network between the first network and at least one external node of the candidate external network.

16. A computer readable storage medium configured with code which upon execution performs a method for improving network-to-network communications in a collection of networks, the method comprising:
- automatically culling a list of IP addresses which have communicated with one or more nodes in a first network, thereby getting a set of external nodes which have a likelihood of future communications with the first network that meets or exceeds a predefined likelihood threshold, wherein the likelihood includes at least one of: a numeric weight, a probability value, or an enumeration value;
- automatically generating a graph which connects one or more nodes of the first network with one or more of the external nodes;
- based on at least the graph, automatically identifying external nodes which have a strength of connection with the first network that meets or exceeds a predefined connection strength threshold;
- automatically grouping at least a portion of the external nodes into a candidate external network; and
- displaying an identification of the candidate external network, thereby facilitating an improvement in networking between the first network and the candidate external network.

17. The computer readable storage medium of claim 16, wherein culling to get a set of external nodes comprises at least one of the following:
- selecting external nodes at IP addresses whose frequency of communications with the node of the first network meets or exceeds a specified communication frequency threshold;
- selecting external nodes at IP addresses whose representative duration of individual communication with the node of the first network meets or exceeds a specified communication duration threshold.

18. The computer readable storage medium of claim 16, wherein the code further comprises a user interface comprising at least one of the following:
- an interface to code for establishing a virtual private network which carries traffic between the first network and the candidate external network;
- an interface to code for improving an allocation of bandwidth which carries traffic between the first network and the candidate external network;
- an interface to code for detecting anomalous traffic from or with the first network, or both;
- an interface to code for adding at least one node of the candidate external network to the first network.

19. The computer readable storage medium of claim 16, wherein automatically grouping at least a portion of the external nodes into a candidate external network comprises finding a range of IP addresses in which a density of IP addresses that communicate with the first network meets or exceeds a specified IP address density.

20. The computer readable storage medium of claim 16, wherein automatically grouping at least a portion of the external nodes into a candidate external network comprises grouping virtual machines which execute on an infrastructure provided by a cloud service provider.

* * * * *